United States Patent
Yang et al.

(10) Patent No.: US 8,780,707 B2
(45) Date of Patent: Jul. 15, 2014

(54) SERVICE FLUX ALLOCATION METHOD AND EQUIPMENT THEREOF

(75) Inventors: Bo Yang, Shenzhen (CN); Xiaoli Song, Shenzhen (CN)

(73) Assignee: ZTE Corporation (CN)

( * ) Notice: Subject to any disclaimer, the term of this patent is extended or adjusted under 35 U.S.C. 154(b) by 307 days.

(21) Appl. No.: 13/386,164

(22) PCT Filed: Mar. 25, 2010

(86) PCT No.: PCT/CN2010/071285
§ 371 (c)(1),
(2), (4) Date: Jan. 20, 2012

(87) PCT Pub. No.: WO2011/009306
PCT Pub. Date: Jan. 27, 2011

(65) Prior Publication Data
US 2012/0113805 A1   May 10, 2012

(30) Foreign Application Priority Data
Jul. 24, 2009   (CN) .......................... 2009 1 0089854

(51) Int. Cl.
*H04L 12/26* (2006.01)
(52) U.S. Cl.
USPC ............ 370/229; 370/216; 370/252; 370/912
(58) Field of Classification Search
USPC .................................. 370/229, 216, 252, 912
See application file for complete search history.

(56) References Cited

U.S. PATENT DOCUMENTS

2009/0182874 A1* 7/2009 Morford et al. ................ 709/224
2010/0191604 A1* 7/2010 Raleigh ........................... 705/16

FOREIGN PATENT DOCUMENTS

| CN | 101102184 A | 1/2008 |
| CN | 101217494 A | 7/2008 |

OTHER PUBLICATIONS

DFI—DPI—Deep Flow Inspect, Copyright 1994-2009 China Academic Journal Electronic Publishing House. All rights reserved. http://www.cnki.net—3 pages.
PCT International Search Report, Application No. PCT/CN2010/07125, Applicant ZTE Corporation, 4 pages.

* cited by examiner

*Primary Examiner* — Mark Rinehard
*Assistant Examiner* — Ellen A Kirillova
(74) *Attorney, Agent, or Firm* — Brooks Kushman P.C.

(57) ABSTRACT

The present invention discloses a service flux allocation method, which includes the steps of: by establishing a usable single board information database (101), and according to the processing ability of each Deep Packet Inspection (DPI) service identifying single board stored in the usable single board information data base and the present flux (102), allocating the service flux which needed to be identified fairly to each DPI service identifying single board (103). The present invention also discloses a service flux allocation equipment, which includes a storage module and an allocation module. The method and the equipment of the present invention make the service flux which needed to be identified allocated fairly to each DPI service identifying single board.

8 Claims, 2 Drawing Sheets

SERVICE FLUX ALLOCATION METHOD AND EQUIPMENT THEREOF

CROSS-REFERENCE TO RELATED APPLICATIONS

This application is a U.S. national phase of PCT Application No. PCT/CN2010/071285 filed Mar. 25, 2010, which claims priority to Chinese Application No. 200910089854.0 filed Jul. 24, 2009, the disclosures of which are incorporated in their entirety by reference herein.

TECHNICAL FIELD

The present invention relates to the computer network communication technology, and in particular, to a service flux allocation method and equipment thereof.

BACKGROUND OF THE RELATED ART

Network management has higher and higher requirements on precision operation, suppression of un-allowed services, network security guard and service resource management, which has accelerated the development of service identification technology, represented by, in the device layer, integration of a DPI (Deep Packet Inspection) service identifying board in more and more network devices. The so called "deep" in the DPI service identifying card is relative to the message analysis level of the common L2-L4 switcher/router. The common L2-L4 switcher/router analyzes the content below layer 4 in an IF packet including a source address, a destination address, a source port, a destination port and the protocol type, while the DPI service identifying board does not only analyze the preceding layers but also has an additional function of identifying data packet content.

With the growing expansion of network scale and the growing increase of service flux, the demand for upgrading service identifying network to increase the volume of the service identifying network has become more and more urgent. In the existing upgrading scheme, the scheme of adding DPI service identifying boards to the original switching device in the service identifying network may decrease the cost for upgrading the service identifying network, and is accepted by operators. However, this scheme will cause a switching device to have several DPI service identifying boards, so the master control board of the switching device needs to allocate equally the flux needing to be identified to each DPI service identifying board of the switching device to avoid the overload of a certain DPI service identifying board or certain DPI service identifying boards caused by unequal allocation of the service identifying flux. The usual method for allocation is static configuration, which is specifically: configuring each path for accessing the switching device for each DPI service identifying board respectively, and each DPI service identifying board processing only the service flux on the path configured to itself. The method performs configuration based on paths, but the service flux on paths changes all the time, and the allocation of the service flux can not be equal, so the problem of the overload of DPI service identifying boards caused by the unequal allocation of the service identifying flux still can not be avoided efficiently.

SUMMARY OF THE INVENTION

In view of that the above, the main purpose of the invention is to provide a service flux allocation method and equipment thereof to allocate equally the service flux needing to be identified to each DPI service identifying board.

To achieve the above purpose, the technical scheme of the invention is implemented as follows:

a method for allocating service flux, wherein, an available board information base is pre-established, and the method further comprises:

a master control board obtaining residual processing capability of each DPI (Deep Packet Inspection) service identifying board according to processing capability and current flux, stored in the available board information base, of each DPI service identifying board; and allocating service flux needing to be identified to each DPI service identifying board according to the residual processing capability of each DPI service identifying board.

The process of allocating service flux needing to be identified to each DPI service identifying board comprises:

taking the residual processing capability of each DPI service identifying board as a weight of the DPI service identifying board to calculate a sum of weights of all DPI service identifying boards;

dividing averagely the service flux needing to be identified to flux groups such that a number of flux groups obtained by the dividing is equal to the sum of the weights obtained by the calculating;

allocating the flux groups to each DPI service identifying board such that the number of flux groups allocated to a DPI service identifying board is equal to the weight of the DPI service identifying board.

The process of establishing the available board information base comprises:

pre-setting the available board information base; attributes contained in the available board information base comprising a slot, physical state, processing capability and current flux of the DPI service identifying board;

the DPI service identifying board establishing a connection to the master control board, and reporting the slot, physical state, processing capability and current flux of the DPI service identifying board to the master control board; the master control board correspondingly storing the slot, processing capability and current flux of the DPI service identifying board which have been received in a same table entry of the available board information base, and setting the physical state of the table entry to be a stable state.

The method further comprises: maintaining the available board information base; the maintaining the available board information base being specifically:

each DPI service identifying board which has established a connection to the master control board reporting periodically the current flux of the DPI service identifying board to the master control board;

the master control board using the received current flux reported by the DPI service identifying board to replace the current flux, stored in the available board information base, of the DPI service identifying board.

The process for maintaining the available board information base further comprises:

after detecting that the DPI service identifying board fails, the master control board deleting the table entry corresponding to the DPI service identifying board in the available board information base;

after being recovered, the DPI service identifying board recovering the connection to the master control board, and reporting the slot, processing capability and current flux of the DPI service identifying board to the master control board, and after the physical state of the DPI service identifying board is stable, sending a notification indicating a stable physical state to the master control board;

after receiving the notification, the master control board storing the slot, processing capability and current flux of the DPI service identifying board which have been received in a same table entry of the available board information base, and setting the physical state of the table entry to be a stable state.

An equipment for allocating service flux, wherein, the equipment comprises a storing module and an allocating module; wherein, the storing module is configured to establish an available board information base;

the allocating module is configured to obtain residual processing capability of each DPI (Deep Packet Inspection) service identifying board according to processing capability and current flux, stored in the available board information base, of each DPI service identifying board; and allocate service flux needing to be identified to each DPI service identifying board according to the residual processing capability of each DPI service identifying board.

The allocating module comprises a calculating module and a flux allocating module; wherein, the allocating module is configured to obtain residual processing capability of each DPI service identifying board according to processing capability and current flux, stored in the available board information base, of each DPI service identifying board; take the residual processing capability of each DPI service identifying board as a weight of the DPI service identifying board and calculate a sum of weights of all DPI service identifying boards;

the flux allocating module is configured to divide averagely the service flux needing to be identified to flux groups such that a number of flux groups obtained by the dividing is equal to the sum of the weights obtained by the calculating; allocate the flux groups to each DPI service identifying board such that the number of flux groups allocated to a DPI service identifying board is equal to the weight of the DPI service identifying board.

The equipment further comprises:

the DPI service identifying board configured to, when a connection to the master control board is established, report a slot, physical state, processing capability and current flux of the DPI service identifying board to the storing module;

the storing module comprising a setting module and a first adding module; wherein, the setting module is configured to set the available board information base; attributes contained in the available board information base comprises the slot, physical state, processing capability and current flux of the DPI service identifying board;

the first adding module is configured to receive the slot, physical state, processing capability and current flux sent by the DPI service identifying board, and correspondingly store the slot, processing capability and current flux of the DPI service identifying board which have been received in a same table entry of the available board information base, and set the physical state of the table entry to be a stable state.

The DPI service identifying board is further configured to report periodically the current flux of the DPI service identifying board to the storing module after establishing a connection to the master control board;

the storing module further comprises:

a first maintaining module, which is configured to use the received current flux reported by the DPI service identifying board to replace the current flux, stored in the available board information base, of the DPI service identifying board.

The storing module further comprises:

a monitoring module, which is configured to monitor operating condition of the DPI service identifying board, and after detecting that the DPI service identifying board fails, delete the table entry corresponding to the DPI service identifying board in the available board information base;

the DPI service identifying board, which is further configured to, when the connection to the master control board is recovered, report the slot, processing capability and current flux of the DPI service identifying board to the storing module, and after the physical state of the DPI service identifying board is stable, send a notification indicating stable physical state to the storing module;

the storing module further comprises:

a second adding module, which is configured to receive the slot, processing capability and current flux sent by the DPI service identifying board, and after receiving the notification sent by the DPI service identifying board, store the slot, processing capability and current flux of the DPI service identifying board which have been received in a same table entry of the available board information base, and set the physical state of the table entry to be a stable state.

The service flux allocation method and equipment thereof provided in the invention allocate equally the service flux needing to be identified to each DPI service identifying board by establishing an available board information base and according to the processing capability and current flux of each DPI service identifying board stored in the available board information base, thus solving the problem of the overload of DPI service identifying boards caused by the unequal allocation of the service identifying flux.

PREFERRED EMBODIMENTS OF THE PRESENT INVENTION

Figure 1:
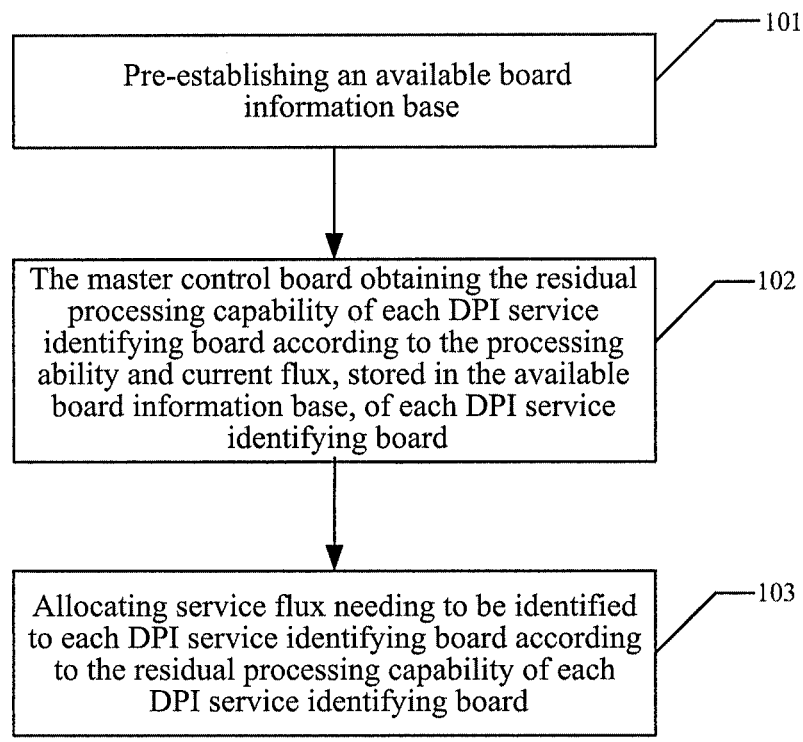
FIG. 1 is a flowchart of the implementing of the method for allocating service flux in an example of the invention.

The implementing process of the method for allocating service flux in an example of the invention is as shown in FIG. 1, comprising the following steps of:

step 101, pre-establishing an available board information base.

Herein, the step of pre-establishing an available board information base is specifically:

step a1, pre-setting the available board information base; attributes contained in the available board information base comprising the slot, physical state, processing capability and current flux of the DPI (Deep Packet Inspection) service identifying board;

step b1, the DPI service identifying board establishing a connection to the master control board, and reporting the slot, physical state, processing capability and current flux of the DPI service identifying board to the master control board; the master control board correspondingly storing the slot, processing capability and current flux of the DPI service identifying board which have been received in the same table entry of the available board information base, and setting the physical state of the table entry to be a stable state.

Herein, after the step 101, the example of the invention further comprises: maintaining the available board information base; the maintaining the available board information base is specifically:

step a2, each DPI service identifying board which has established a connection to the master control board reporting periodically the current flux of the DPI service identifying board to the master control board;

step b2, the master control board using the received current flux reported by the DPI service identifying board to replace the current flux, stored in the available board information base, of the DPI service identifying board.

The process for maintaining the available board information base further comprises:

step a3, after detecting that the DPI service identifying board fails, the master control board deleting the table entry corresponding to the DPI service identifying board in the available board information base;

wherein, the step of the master control board detecting that the DPI service identifying board fails is specifically:

if only the service module of the DPI service identifying board fails, its control module reporting the failure to the master control board; or the master control board sending probe information to the DPI service identifying board, and judging that the DPI service identifying board fails if no response is received.

step b3, after being recovered, the DPI service identifying board recovering the connection to the master control board, and reporting the slot, processing capability and current flux of the DPI service identifying board to the master control board; and after the physical state of the DPI service identifying board is stable, sending a notification indicating a stable physical state to the master control board; after receiving the notification, the master control board storing the slot, processing capability and current flux of the DPI service identifying board which have been received in the same table entry of the available board information base, and setting the physical state of the table entry to be a stable state.

step 102, the master control board obtaining residual processing capability of each DPI service identifying board according to processing capability and current flux, stored in the available board information base, of each DPI service identifying board;

wherein, the difference between the processing capability and the current flux of a DPI service identifying board is precisely the residual processing capability of the DPI service identifying board.

step 103, allocating service flux needing to be identified to each DPI service identifying board according to the residual processing capability of each DPI service identifying board.

Wherein, the process of allocating service flux needing to be identified to each DPI service identifying board comprises:

taking the residual processing capability of each DPI service identifying board as a weight of the DPI service identifying board and calculating a sum of weights of all DPI service identifying boards;

dividing averagely the service flux needing to be identified to flux groups such that the number of flux groups obtained by the dividing is equal to the sum of the weights obtained by the calculating;

allocating the flux groups to each DPI service identifying board such that the number of flux groups allocated to a DPI service identifying board is equal to the weight of the DPI service identifying board.

Figure 2:
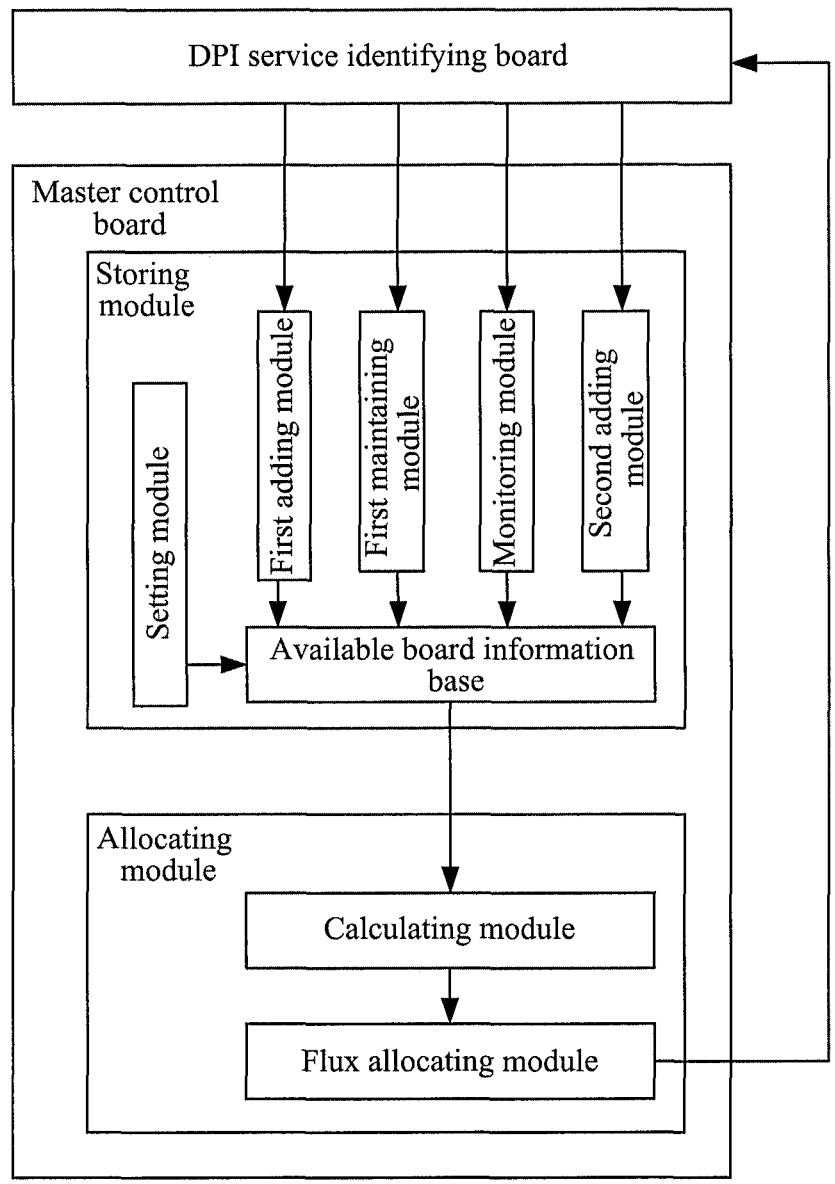
FIG. 2 illustrates the structure of the equipment for allocating service flux in an example of the invention.

The structure of the equipment for allocating service flux in an example of the invention is as shown in FIG. 2, comprising a storing module and an allocating module; wherein, the storing module is configured to establish an available board information base;

the allocating module is configured to obtain residual processing capability of each DPI (Deep Packet Inspection) service identifying board according to processing capability and current flux, stored in the available board information base, of each DPI service identifying board; and allocate service flux needing to be identified to each DPI service identifying board according to the residual processing capability of each DPI service identifying board.

Herein, the storing module and the allocating module are provided in the master control board of the switching device.

Wherein, the allocating module comprises a calculating module and a flux allocating module; wherein, the allocating module is configured to obtain residual processing capability of each DPI service identifying board according to processing capability and current flux, stored in the available board information base, of each DPI service identifying board; take the residual processing capability of each DPI service identifying board as a weight of the DPI service identifying board and calculate a sum of weights of all DPI service identifying boards;

the flux allocating module is configured to divide averagely the service flux needing to be identified to flux groups such that the number of flux groups obtained by the dividing is equal to the sum of the weights obtained by the calculating; allocate the flux groups to each DPI service identifying board such that the number of flux groups allocated to a DPI service identifying board is equal to the weight of the DPI service identifying board.

Furthermore, the equipment further comprises:

the DPI service identifying board configured to, when establishing a connection to the master control board, report the slot, physical state, processing capability and current flux of the DPI service identifying board to the storing module;

accordingly, the storing module comprises a setting module and a first adding module; wherein, the setting module is configured to set the available board information base; attributes contained in the available board information base comprises the slot, physical state, processing capability and current flux of the DPI service identifying board;

the first adding module is configured to receive the slot, physical state, processing capability and current flux sent by the DPI service identifying board, and correspondingly store the slot, processing capability and current flux of the DPI service identifying board which have been received in the same table entry of the available board information base, and set the physical state of the table entry to be a stable state.

Furthermore, the DPI service identifying board is further configured to report the current flux of the DPI service identifying board to the storing module in a predetermined reporting period after establishing the connection to the master control board;

accordingly, the storing module further comprises:

a first maintaining module, which is configured to use the received current flux reported by the DPI service identifying board to replace the current flux, stored in the available board information base, of the DPI service identifying board.

Furthermore, the storing module further comprises:

a monitoring module, which is configured to monitor the operating condition of the DPI service identifying board, and after detecting that the DPI service identifying board fails, delete the table entry corresponding to the DPI service identifying board in the available board information base;

the DPI service identifying board, which is further configured to, when the connection to the master control board is recovered, report the slot, processing capability and current flux of the DPI service identifying board to the storing module, and after the physical state of the DPI service identifying board is stable, send a notification indicating a stable physical state to the storing module;

accordingly, the storing module further comprises:

a second adding module, which is configured to receive the slot, processing capability and current flux sent by the DPI service identifying board, and after receiving the notification sent by the DPI service identifying board, store the slot, processing capability and current flux of the DPI service identifying board which have been received in the same table entry of the available board information base, and set the physical state of the table entry to be a stable state.

It can be seen from the above mentioned that the service flux allocation method and equipment thereof provided in the invention allocate equally the service flux needing to be identified to each DPI service identifying board by establishing an available board information base and according to the processing capability and current flux of each DPI service identifying board stored in the available board information base, thus solving the problem of the overload of DPI service identifying boards caused by the unequal allocation of the service identifying flux.

The above mentioned is just the preferred examples of the invention, which are not used to limit the protection scope of the invention.

What is claimed is:

1. A method for allocating service flux, wherein, an available board information base is pre-established, and the method further comprises:

a master control board obtaining residual processing capability of each DPI (Deep Packet Inspection) service identifying board according to processing capability and current flux, stored in the available board information base, of each DPI service identifying board; and allocating service flux needing to be identified to each DPI service identifying board according to the residual processing capability of each DPI service identifying board;

wherein the process of allocating service flux needing to be identified to each DPI service identifying board comprises:

taking the residual processing capability of each DPI service identifying board as a weight of the DPI service identifying board and calculating a sum of weights of all DPI service identifying boards;

dividing averagely the service flux needing to be identified to flux groups such that a number of flux groups obtained by the dividing is equal to the sum of the weights obtained by the calculating; and allocating the flux groups to each DPI service identifying board such that the number of flux groups allocated to a DPI service identifying board is equal to the weight of the DPI service identifying board.

2. The method according to claim 1, wherein, the process of establishing the available board information base comprises:

pre-setting the available board information base; attributes contained in the available board information base comprising a slot, physical state, processing capability and current flux of the DPI service identifying board;

the DPI service identifying board establishing a connection to the master control board, and reporting the slot, physical state, processing capability and current flux of the DPI service identifying board to the master control board; the master control board correspondingly storing the slot, processing capability and current flux of the DPI service identifying board which have been received in a same table entry of the available board information base, and setting the physical state of the table entry to be a stable state.

3. The method according to claim 2, wherein, the method further comprises: maintaining the available board information base; the maintaining the available board information base is specifically:

each DPI service identifying board which has established a connection to the master control board reporting periodically the current flux of the DPI service identifying board to the master control board;

the master control board using the received current flux reported by the DPI service identifying board to replace the current flux, stored in the available board information base, of the DPI service identifying board.

4. The method according to claim 3, wherein, the process for maintaining the available board information base further comprises:

after detecting that the DPI service identifying board fails, the master control board deleting the table entry corresponding to the DPI service identifying board in the available board information base;

after being recovered, the DPI service identifying board recovering the connection to the master control board, and reporting the slot, processing capability and current flux of the DPI service identifying board to the master control board; and after the physical state of the DPI service identifying board is stable, sending a notification indicating a stable physical state to the master control board;

after receiving the notification, the master control board storing the slot, processing capability and current flux of the DPI service identifying board which have been received in a same table entry of the available board information base, and setting the physical state of the table entry to be a stable state.

5. An equipment for allocating service flux, wherein the equipment comprises a storing module and an allocating module; wherein, the storing module is configured to establish an available board information base;

the allocating module is configured to obtain residual processing capability of each DPI (Deep Packet Inspection) service identifying board, according to processing capability and current flux, stored in the available board information base, of each DPI service identifying board; and allocate service flux needing to be identified to each DPI service identifying board according to the residual processing capability of each DPI service identifying board;

the allocating module comprises a calculating module and a flux allocating module; wherein, the calculating module is configured to obtain residual processing capability of each DPI service identifying board according to processing capability and current flux, stored in the available board information base, of each DPI service identifying board; take the residual processing capability of each DPI service identifying board as a weight of the DPI service identifying board and calculate a sum of weights of all DPI service identifying boards; and the flux allocating module is configured to divide averagely the service flux needing to be identified to flux groups, such that a number of flux groups obtained by the dividing is equal to the sum of the weights obtained by the calculating; and allocate the flux groups to each DPI service identifying board such that the number of flux groups allocated to a DPI service identifying board is equal to the weight of the DPI service identifying board.

6. The equipment according to claim 5, wherein, the equipment further comprises:
   the DPI service identifying board configured to, when a connection to the master control board is established, report a slot, physical state, processing capability and current flux of the DPI service identifying board to the storing module;
   the storing module comprises a setting module and a first adding module; wherein,
   the setting module is configured to set the available board information base; attributes contained in the available board information base comprises the slot, physical state, processing capability and current flux of the DPI service identifying board;
   the first adding module is configured to receive the slot, physical state, processing capability and current flux sent by the DPI service identifying board, and correspondingly store the slot, processing capability and current flux of the DPI service identifying board which have been received in a same table entry of the available board information base, and set the physical state of the table entry to be a stable state.

7. The equipment according to claim 6, wherein, the DPI service identifying board is further configured to report periodically the current flux of the DPI service identifying board to the storing module after the connection to the master control board is established;
   the storing module further comprises:
   a first maintaining module, which is configured to use the received current flux reported by the DPI service identifying board to replace the current flux, stored in the available board information base, of the DPI service identifying board.

8. The equipment according to claim 6, wherein, the storing module further comprises:
   a monitoring module, which is configured to monitor operating condition of the DPI service identifying board, and after detecting that the DPI service identifying board fails, delete the table entry corresponding to the DPI service identifying board in the available board information base;
   the DPI service identifying board, which is further configured to, when the connection to the master control board is recovered, report the slot, processing capability and current flux of the DPI service identifying board to the storing module, and after the physical state of the DPI service identifying board is stable, send a notification indicating a stable physical state to the storing module;
   the storing module further comprises:
   a second adding module, which is configured to receive the slot, processing capability and current flux sent by the DPI service identifying board, and after receiving the notification sent by the DPI service identifying board, store the slot, processing capability and current flux of the DPI service identifying board which have been received in a same table entry of the available board information base, and set the physical state of the table entry to be a stable state.

* * * * *